United States Patent
Groll

(10) Patent No.: US 7,926,418 B2
(45) Date of Patent: Apr. 19, 2011

(54) GRIDDLE PLATE HAVING A VACUUM BONDED COOK SURFACE

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 1571 days.

(21) Appl. No.: 11/245,478

(22) Filed: Oct. 6, 2005

(65) Prior Publication Data

US 2006/0107842 A1     May 25, 2006

Related U.S. Application Data

(60) Provisional application No. 60/616,801, filed on Oct. 7, 2004.

(51) Int. Cl.
*A47J 37/10* (2006.01)
(52) U.S. Cl. ........... 99/422; 126/390.1
(58) Field of Classification Search .......... 99/422–425, 99/403–418, 340, 472, 330; 428/190, 107, 428/158, 607, 235.2; 220/573.1, 573.3, 912; 29/527.2, 527.4; 425/112, 383; 126/390.1; 219/444.1, 544, 492, 459, 457
See application file for complete search history.

(56) References Cited

U.S. PATENT DOCUMENTS

| | | |
|---|---|---|
| 2,196,484 A | 4/1940 | Wentworth |
| 2,253,577 A | 8/1941 | Pearson et al. |
| 2,343,470 A | 3/1944 | Nast |
| 2,539,541 A | 1/1951 | Kelley |
| 2,547,402 A | 4/1951 | Lucas et al. |
| 2,664,492 A | 12/1953 | Fischer |
| 2,685,522 A | 8/1954 | Dunmire |
| 2,820,881 A | 1/1958 | Huck |
| 2,906,192 A | 9/1959 | Oakes |
| 2,939,606 A | 9/1960 | Durbin |
| 3,042,974 A | 7/1962 | Gerstenmaier et al. |
| 3,130,288 A | 4/1964 | Monaco et al. |
| 3,376,652 A | 4/1968 | Hernandez, Jr. |
| 3,686,477 A | 8/1972 | Dills et al. |
| 3,742,178 A | 6/1973 | Hamden, Jr. |
| 3,748,196 A | 7/1973 | Kemeny |
| 3,909,591 A | 9/1975 | Ulam |
| 3,909,592 A | 9/1975 | Eide |
| 4,339,993 A * | 7/1982 | Lee .................. 99/354 |
| 4,431,908 A | 2/1984 | Fischer et al. |
| 4,653,469 A | 3/1987 | Miyaji et al. |
| 4,668,562 A * | 5/1987 | Street ............ 428/218 |
| 4,717,810 A | 1/1988 | Schreder |
| 4,734,995 A | 4/1988 | Pagnozzi et al. |
| 4,790,292 A | 12/1988 | Kuhn |
| 4,993,607 A | 2/1991 | Brun et al. |
| 5,077,072 A | 12/1991 | Sieradzki |
| 5,422,055 A | 6/1995 | Yalvac et al. |
| 5,422,459 A | 6/1995 | Zhou |
| 5,513,558 A | 5/1996 | Erickson et al. |
| 5,567,458 A | 10/1996 | Wu |
| 5,578,160 A | 11/1996 | Krznarich et al. |
| 5,643,485 A | 7/1997 | Potter et al. |
| 5,655,434 A | 8/1997 | Liebermann |
| 5,699,722 A | 12/1997 | Erickson et al. |

(Continued)

*Primary Examiner* — Reginald L Alexander
(74) *Attorney, Agent, or Firm* — The Webb Law Firm

(57) ABSTRACT

A composite griddle plate comprising a first sheet of metal defining a cook surface and a core plate of a metal having a relatively high coefficient of heat conductivity wherein the first sheet remains in intimate contact with an upper surface of the core plate with the aid of a vacuum.

7 Claims, 7 Drawing Sheets

U.S. PATENT DOCUMENTS

| | | | |
|---|---|---|---|
| 5,727,448 A | 3/1998 | Sa | |
| 5,767,487 A | 6/1998 | Tippmann | |
| 5,813,851 A | 9/1998 | Makao | |
| 5,975,629 A | 11/1999 | Lorbiecki | |
| 6,073,545 A | 6/2000 | Huppi et al. | |
| 6,109,504 A * | 8/2000 | Groll | 228/107 |
| 6,131,646 A | 10/2000 | Kelley | |
| 6,152,024 A | 11/2000 | Tippmann | |
| 6,197,428 B1 * | 3/2001 | Rogers | 428/446 |
| 6,283,014 B1 | 9/2001 | Ng et al. | |
| 6,305,272 B1 | 10/2001 | Lin | |
| 6,340,807 B2 | 1/2002 | Wang | |
| 6,360,423 B1 * | 3/2002 | Groll | 29/527.2 |
| 6,544,669 B2 * | 4/2003 | Groll | 428/687 |
| 6,545,252 B2 | 4/2003 | Wang | |
| 6,565,903 B2 | 5/2003 | Ng et al. | |
| 6,576,876 B2 | 6/2003 | Cartossi | |
| 6,992,268 B2 | 1/2006 | Kim | |
| 7,012,229 B2 | 3/2006 | Kim | |
| 7,353,981 B2 * | 4/2008 | Groll | 228/190 |
| 7,378,623 B2 | 5/2008 | Tarenga | |
| 7,488,515 B2 * | 2/2009 | Groll | 427/294 |
| 2003/0213793 A1 * | 11/2003 | Cole et al. | 219/444.1 |
| 2007/0045282 A1 * | 3/2007 | Petrenko | 219/492 |

* cited by examiner

GRIDDLE PLATE HAVING A VACUUM BONDED COOK SURFACE

CROSS-REFERENCE TO RELATED APPLICATION

This application claims the benefit of U.S. Provisional Application No. 60/616,801 filed Oct. 7, 2004, and is hereby incorporated by reference in its entirety.

BACKGROUND OF THE INVENTION

1. Field of the Invention

The present invention relates generally to commercial cooking griddles and, more particularly, to a composite cooking griddle having a thin cook surface layer, preferably of stainless steel, that intimately contacts a thicker heat conductive core layer of copper or aluminum by means of a vacuum.

2. Description of Related Art

In commercial cooking griddles there is a long-felt need to provide a cook surface with a fast thermal recovery time when cooking, for example, frozen hamburger patties. In conventional steel plate griddles, areas of the cook surface occupied by the frozen patties experience a decrease in temperature which requires a prolonged recovery time to reach a desired temperature for proper cooking of the meat. This is caused by the fact that steel does not possess a relatively high coefficient of thermal conductivity. When the hamburger patties are flipped to cook the other side, the patties are usually placed in areas previously occupied by a frozen side and oftentimes are exposed to less than ideal cooler temperatures for proper cooking. Thus, in conventional fast food-type commercial griddles, the throughput time is extended. If the cooking time is not increased, there is a real danger that the meat is not thoroughly cooked, resulting in a health hazard due to the possible presence of *E. coli* bacteria.

An ongoing effort to improve thermal recovery of commercial cooking griddles is evidenced by my U.S. Pat. No. 6,109,504 which utilizes a thick, thermally conductive core layer of copper explosion bonded and rolled with a cook surface of stainless steel. This has proved to be very workable from a commercial cooking standpoint since the copper core offers a much faster heat recovery than does the typical commercial griddle plate made from carbon steel. Unfortunately, the explosion bonded and hot rolled griddle plate of my aforementioned patent is relatively costly to manufacture.

The present invention solves the problems heretofore encountered in the prior art by providing a composite griddle plate having a core of high conductivity metal which transfers heat to an outer cook surface layer of a different metal, much like a roll bonded composite, but at a much lower cost.

SUMMARY OF THE INVENTION

Briefly stated, the present invention is directed to a composite griddle plate comprising a core consisting of a metal having a high coefficient of thermal conductivity such as copper or aluminum. The core plate is faced at least with an upper sheet of a metal such as stainless steel or titanium which defines the cook surface of the griddle plate. The interface between the core plate and upper sheet is under the reduced pressure of a vacuum so as to cause intimate contact between the core and cook surface which increases the thermal conductivity to the cook surface and, thus, reduces the thermal recovery time of the griddle.

Various additional presently preferred embodiments of the invention are disclosed herein. For example, the griddle plate of one such embodiment comprises a high heat conductivity core of copper or aluminum having upper and lower sheets of stainless steel in intimate contact with the core. The entire perimeter of the griddle plate is sealed as by welding and the interior is under a permanently sealed vacuum. Another such presently preferred embodiment utilizes an upper sheet of stainless steel or other metal having a non-stick coating applied thereto. The upper sheet is removably secured to the heat conductive core plate under vacuum utilizing a high temperature gasket or adhesive sealant to maintain the vacuum. The upper sheet may be mechanically secured by bolts or the construction may be placed under a constant vacuum using a vacuum pump. When the non-stick surface ages and/or otherwise loses its non-stick properties, such as with a PTFE-type non-stick coating, the upper sheet can be easily replaced with a freshly non-stick coated upper sheet and the vacuum reestablished.

These, as well as other attributes of my invention, will become more readily apparent when reference is made to the accompanying drawings taken with the detailed description.

DETAILED DESCRIPTION OF THE INVENTION

Figure 1:
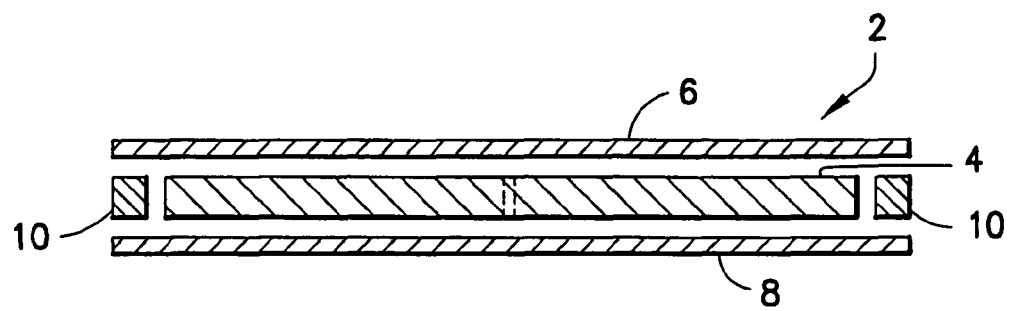
FIG. 1 is a cross-sectional, exploded view of the construction of one presently preferred embodiment of the griddle plate of the present invention.
Figure 2:
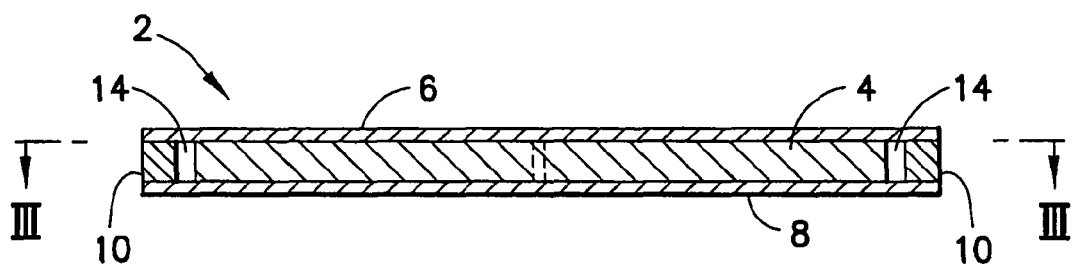
FIG. 2 is a cross-sectional side view of the griddle plate of the invention, similar to FIG. 1, taken along section line II-II of FIG. 3.
Figure 3:
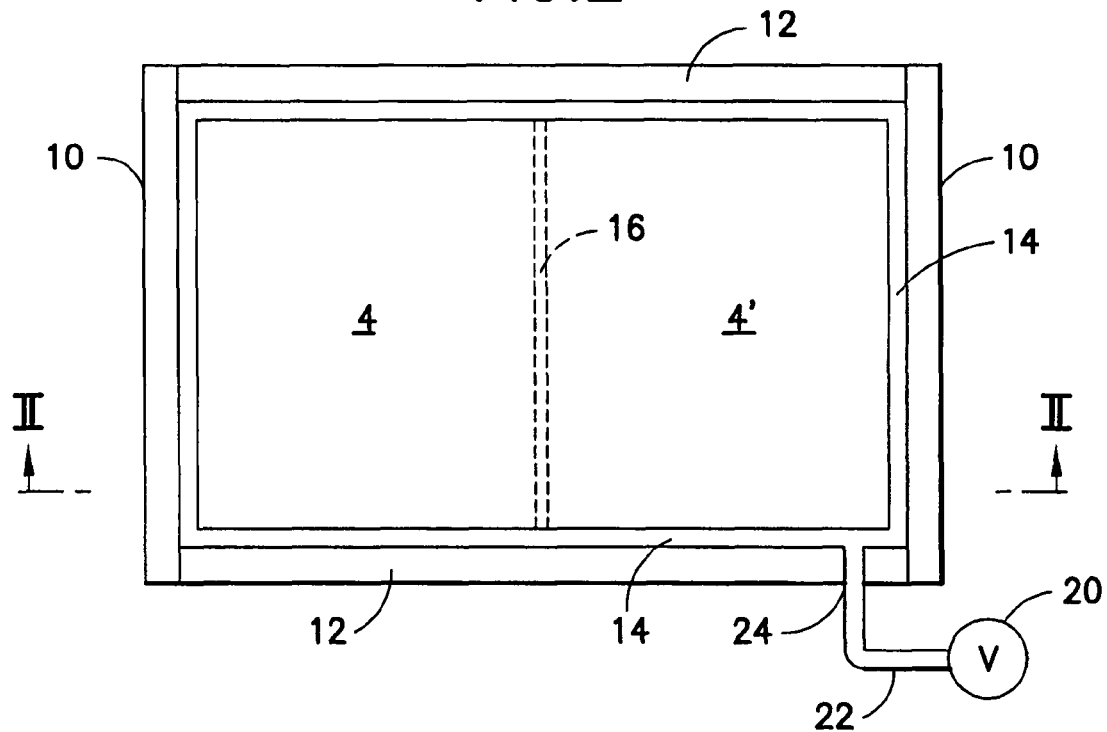
FIG. 3 is a plan view of the griddle plate with the top sheet removed as viewed along line III-III of FIG. 2.

One presently preferred embodiment of the present invention is depicted in FIGS. 1-3 showing the composite griddle plate 2 comprising a core plate 4 having an upper sheet or cook surface 6 and a lower sheet 8. The core plate 4 is a metal having a high coefficient of thermal conductivity such as copper or aluminum. Of the two materials, copper is preferred from the standpoint of thermal conductivity, while aluminum is attractive from a weight standpoint in that aluminum is much lighter than copper in an equivalent thickness while having only a slightly lower coefficient of thermal conductivity. The sheets 6 and 8 in a preferred embodiment are both selected from stainless steel such as Type 304 stainless. However, they need not be of the same type. For example, the upper sheet may be of 304 stainless while the bottom sheet 8 can be a ferromagnetic material such as a carbon steel or a 400 grade ferritic stainless steel for induction cooking purposes. Bottom sheet 8 could also be a nickel/iron material having a Curie temperature within a selected range for griddle cooking. One such material is, for example, 30-50 nickel/balance iron, which has a Curie temperature under induction cooking conditions of from about 400°-450° F. The upper sheet 6 can also be made from titanium which offers a very hard scratch-resistant cook surface which is relatively lightweight and is inert to food products.

The composite griddle plate 2, as shown in the exploded view of FIG. 1, is formed as a welded pack having bars 10 along the ends and bars 12 along the sides forming a border around the perimeter of the griddle plate 2. The upper and lower sheets 6 and 8, respectively, are welded to the bars 10 and 12 to form an airtight seal around the perimeter of the griddle plate 2. Preferably, a small space 14 is maintained between the bars 10 and 12 and the peripheral edges of the core plate 4 to permit improved evacuation of the interior space 14 between the bars 10, 12 and the core plate 4. A vacuum pump 20 communicates with the interior space 14 by way of a conduit 22. The vacuum pump 20 withdraws the atmosphere from the interior of the griddle plate after the assembly has been welded. The pump 20 preferably pulls a vacuum while the composite griddle plate 2 is heated to about 400° F. to drive off the volatiles and expand the atmosphere within the interior. The vacuum is pumped down preferably to at least 29 inches of mercury. At that point the area of the conduit 22 indicated at 24 along the perimeter of the griddle shown in FIG. 3 is closed off and sealed to maintain the vacuum condition within the welded pack.

In this regard, the bar stock 10 and 12 may also be formed preferably of 304 stainless steel. The surfaces of the outer facing sheets 6 and 8 can be polished and have small grooves formed therein to enable the evacuation of the interface between the sheets 6 and 8 and the core plate 4. In the evacuated condition of the vacuum, the sheets 6 and 8 tightly engage the core plate 4 to ensure that no voids are present at the interface so as to increase the thermal conductivity through the cross section of the griddle plate construction. After the griddle plate 2 of FIGS. 1-3 has been constructed in this manner, various elements such as brackets or a grease trap can be welded to the griddle plate without destroying the vacuum condition within the interior. The weld is preferably a tungsten inert gas or a TIG weld, or it may be an automated laser weld. The thinner the sheets 6 and 8, the more the composite acts like the core, and no thermal warpage is present as the griddle plate is heated due to the differences in thermal expansion properties between the core 4 and the sheets 6 and 8.

A further variation of the griddle plate shown in FIGS. 1-3 can be better appreciated with reference to FIG. 3 wherein two spaced-apart core plates 4 and 4' are utilized having a space 16 therebetween. In such a construction, the griddle can be divided into two independent heating zones maintained at two different temperatures by virtue of the insulating air gap provide by space 16 between the adjacent core plates 4 and 4'. In this manner, of course, a multitude of different heating zones can be achieved merely by utilizing separate core plates separated by spaces. For example, four separate heating zones could be achieved in the griddle plate 2 by utilizing four separate core plates 4, each placed in one of the four quadrants of the griddle plate and separated by spaces 16 providing heat insulating air gaps therebetween.

Figure 4:
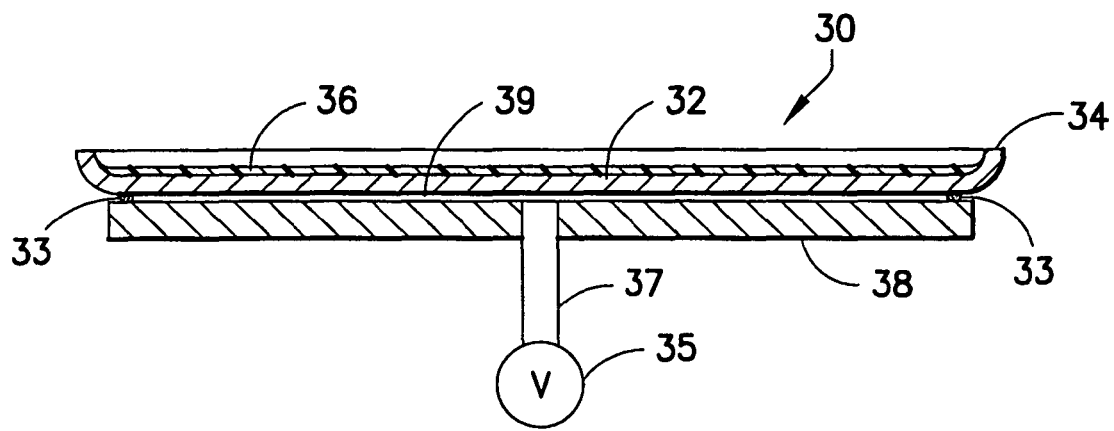
FIG. 4 is a cross-sectional side elevation view of a further embodiment of the griddle plate of the invention.
Figure 5:
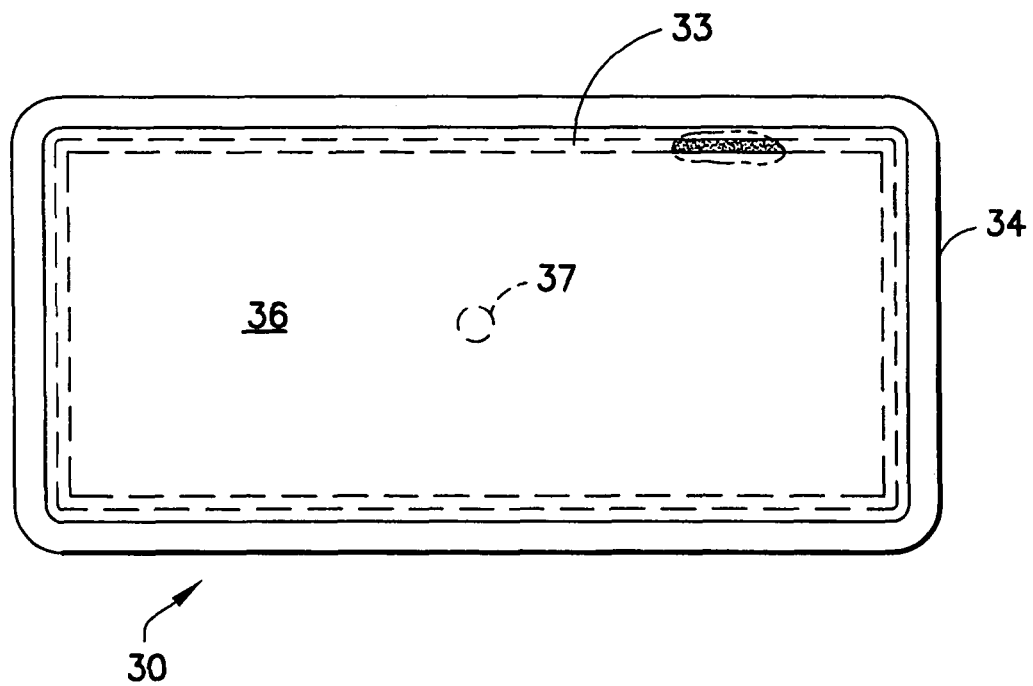
FIG. 5 is a plan view of the griddle plate of FIG. 4.

A further presently preferred embodiment of my invention is depicted in FIGS. 4 and 5 and identified generally as griddle plate 30. Griddle plate 30 comprises an upper sheet 32 having a gasket or bead of high temperature adhesive sealant 33 applied around its perimeter in contact with the high heat conductive plate 38. A presently preferred high temperature, adhesive sealant 33 is a copper silicone "CU-371" sealant manufactured by INTEK Adhesives Ltd., U.K. The upper sheet 32 preferably is a drawn shape having an upwardly formed edge 34 with a non-stick cook surface 36 of Teflon®, for example, applied thereto. A vacuum pump 35 communicates with the space 39 between the sheet 32 and plate 38 by way of a conduit 37 to maintain a constant vacuum in the space 39 to ensure intimate contact between the sheet 32 and the high heat conductive plate 38 of copper or aluminum. The sheet 32 is preferably stainless steel. It is contemplated that the griddle plate 30 would be sold as a unit with the vacuum pump 35 integral therewith. The pump 35 would be activated when the griddle is in use so as to maintain an intimate contact between the cook surface sheet 32 and the high heat conductive plate 38. In the event the non-stick surface 36 becomes worn, the entire plate 32 can be replaced merely by shutting off the vacuum pump 35 and removing the sheet 32 from the plate 38. A new upper sheet 32 with a fresh non-stick surface 36 applied thereto may then be reapplied over the high heat conductive plate 38 and the vacuum reestablished by activation of the vacuum pump 35. A fresh gasket or bead of adhesive sealant 33 would also be applied as previously described in order to establish a vacuum-tight seal between the new upper sheet 32 and the existing plate 38.

Figure 6A:
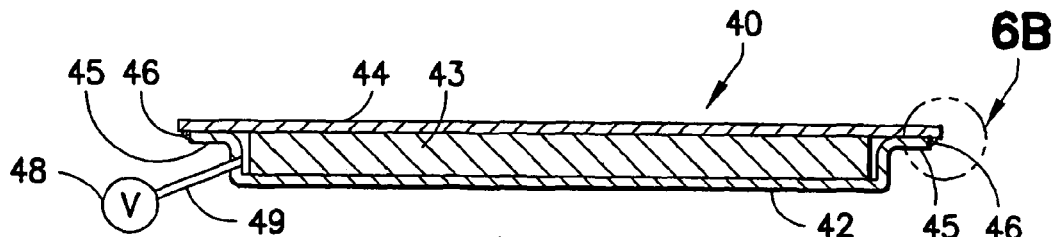
FIGS. 6A and 6B depict a further presently preferred embodiment of the present invention.
Figure 6B:
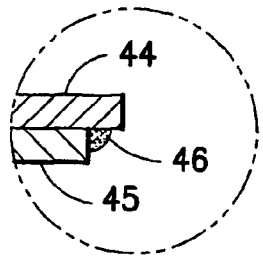

A still further embodiment of the present invention is depicted in FIGS. 6A and 6B designated by reference numeral 40. The griddle plate 40 comprises a deep-drawn lower sheet 42 preferably of stainless steel and an upper sheet 44, also preferably a stainless steel. The upper sheet 44 defines the cook surface. An inner core 43 of copper or aluminum is, likewise, provided. The lower sheet 42 carries an upturned peripheral flange 45 which conveniently supports the top sheet 44. A weld bead 46, as more clearly seen in FIG. 6B, establishes an airtight seal within the interior of the griddle plate. A vacuum pump 48 communicates with a conduit 49 for establishment of a vacuum within the interior. Once again, a vacuum, preferably greater than 29 inches of mercury within the interior, is preferred to establish intimate contact between the sheets 42, 44 and core plate 43. When a vacuum of the desired magnitude has been established, the conduit 49 is sealed off and the griddle plate 40 is ready for use.

Figure 7A:
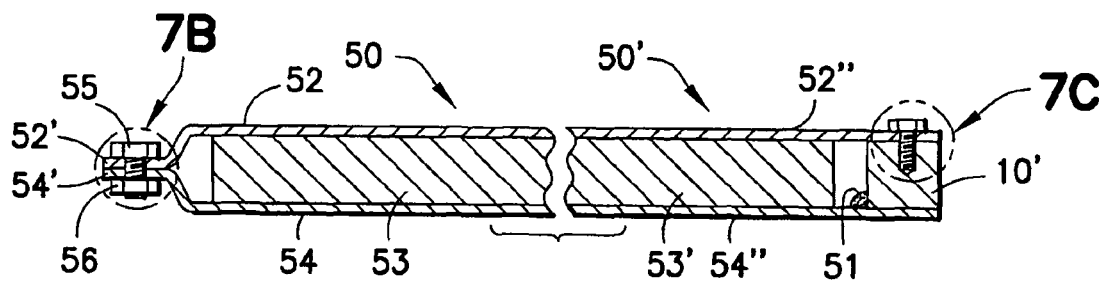
FIGS. 7A to 7C depict yet another presently preferred embodiment of my invention.
Figure 7B:
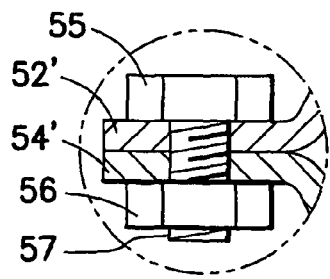
Figure 7C:
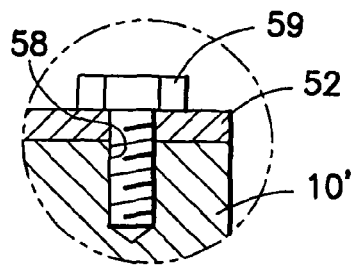

A still further embodiment of the present invention with a replaceable cook surface is depicted in FIGS. 7A-7B by reference numeral 50 and 50'. The griddle plate 50 shown in the left-hand portion of drawing FIGS. 7A and 7B comprises an upper sheet 52 and a lower sheet 54 of stainless steel carrying, respectively, flanges 52' and 54'. The upper and lower sheets 52 and 54 closely engage a core plate 53 of copper or aluminum, for example. A peripheral seal is mechanically established by way of a plurality of bolts 55 and nuts 56 which threadably engage the threaded bolt shaft 57, FIG. 7B. A gasket or adhesive sealant (not shown) may also be applied within the interface between the flanges 52' and 54' to ensure that a vacuum condition is established as previously described.

A further embodiment of the griddle plate 50' is shown on the right-hand portion of FIG. 7A wherein the lower sheet 54" is joined at weld bead 51 around the perimeter of the griddle plate to peripheral bars 10'. The top sheet 52" is bolted to the bar 10' by way of a plurality of bolt-like fasteners 59 threadably secured within threaded bores 58 formed in the bar 10'. Likewise, an airtight gasket or high temperature sealant may be applied (not shown) between the upper plate 52" and the peripheral bars 10'. While not shown specifically in FIG. 7A, of course, it would be understood that an external vacuum would be applied to the interior of the griddle plate to establish a vacuum of at least 29 inches of mercury and then sealed off prior to use as previously described with the embodiments discussed above.

Figure 8:
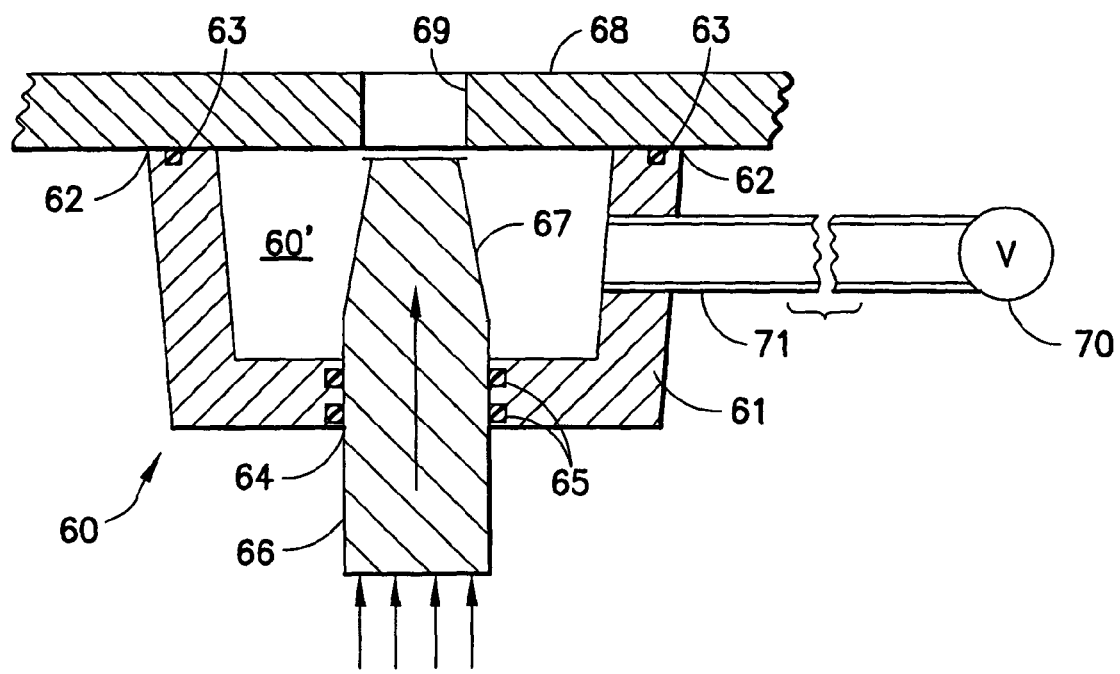
FIG. 8 is a cross-sectional side view of a vacuum evacuating and sealing tool for use in making the griddle plate of the invention, the tool forming another aspect of the invention.

A novel vacuum fixture generally designated 60, useful in pulling a vacuum on the griddle plates and for sealing the griddle plates of the present invention, is depicted in FIG. 8. The vacuum fixture 60 comprises a cup-like member 61 having a sealing edge 62 for engagement with the sidewall 68 of the griddle plate which, in most instances, would be the previously-described bar stock 10 or 12. The sealing edge 62 of the fixture 60 carries an O-ring 63 and has an opening 64 with O-ring seals 65 in place thereon for receiving a movable tapered pin 66. The pin 66 has a tapered end 67 for insertion into a hole 69 in the sidewall of the griddle plate. A vacuum pump 70 communicates with a conduit 71 which, in turn, communicates with the interior 60' of the cup 61 and the interior of the griddle plate via the hole 69. When the prescribed vacuum, for example, at least 29 inches of mercury has been reached, the tapered pin 66 is driven in the direction of the arrows shown in FIG. 8 to force the pin 66 into the hole 69. The tapered end 67 of the pin 66 then becomes tightly wedged in the hole 69 and seals off the hole as it is driven therein. The pin 66 which protrudes away from sidewall 68 may then we machined away flush with the exterior of the griddle plate and a precautionary weld bead or solder may be applied to further seal the assembly. The fixture 60 may then be removed and used to reseal additional griddle plates.

Figure 9:
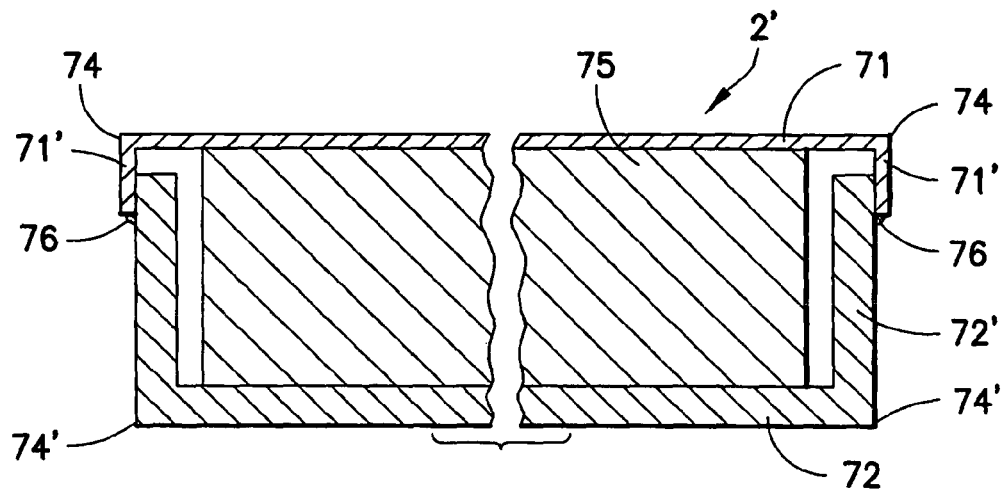
FIG. 9 is a cross-sectional longitudinal side view of a further embodiment of the griddle plate construction of the present invention.
Figure 10:
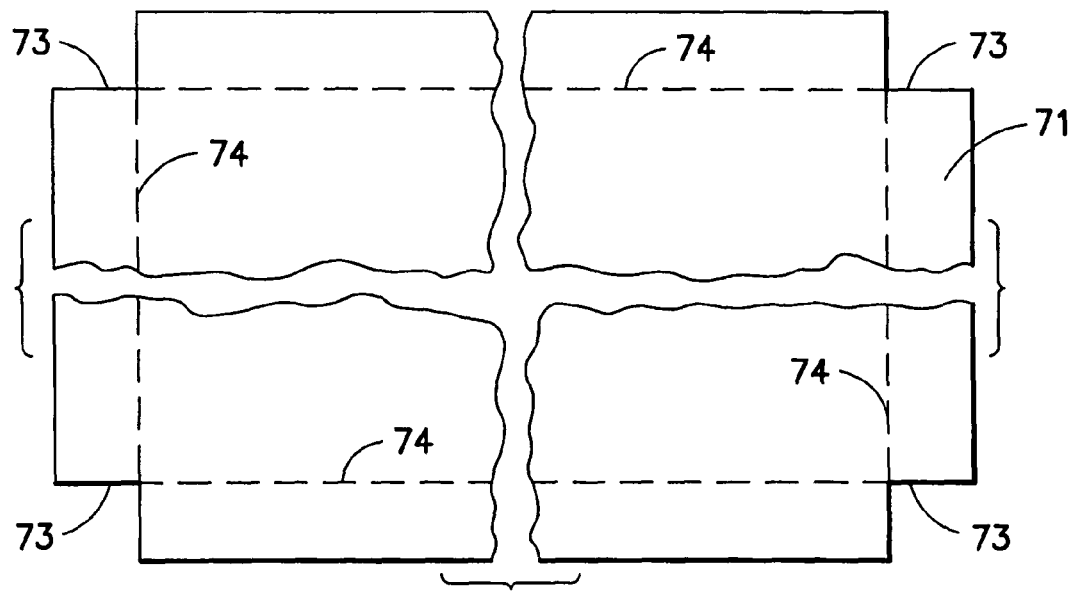
FIG. 10 is a fragmented plan view of the upper sheet of stainless steel forming the cook surface of the griddle plate of FIG. 9 prior to fabrication.
Figure 11:
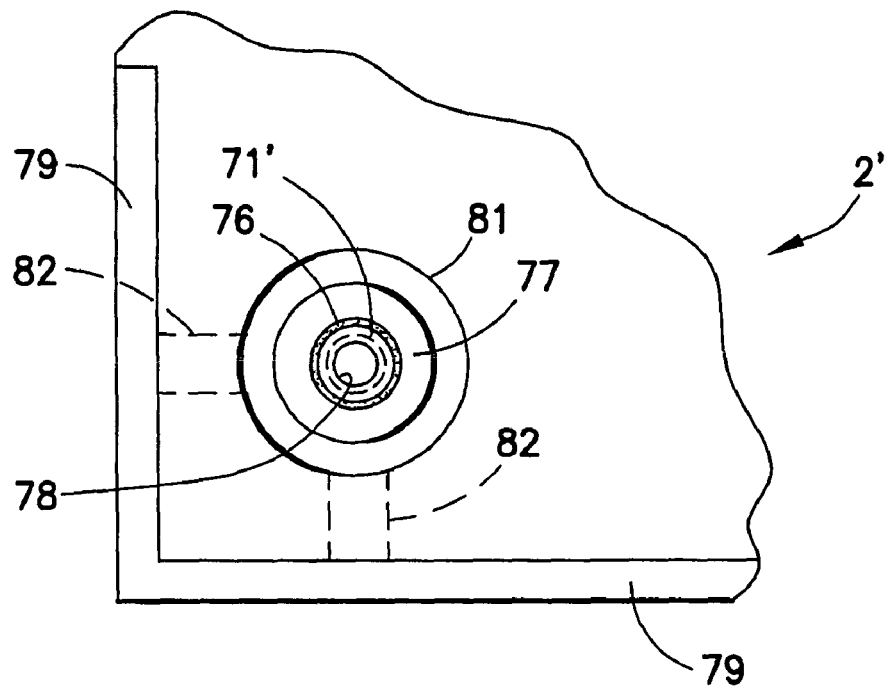
FIG. 11 is a fragmented plan view of the vacuum fitting employed in the embodiment of FIG. 9.
Figure 12:
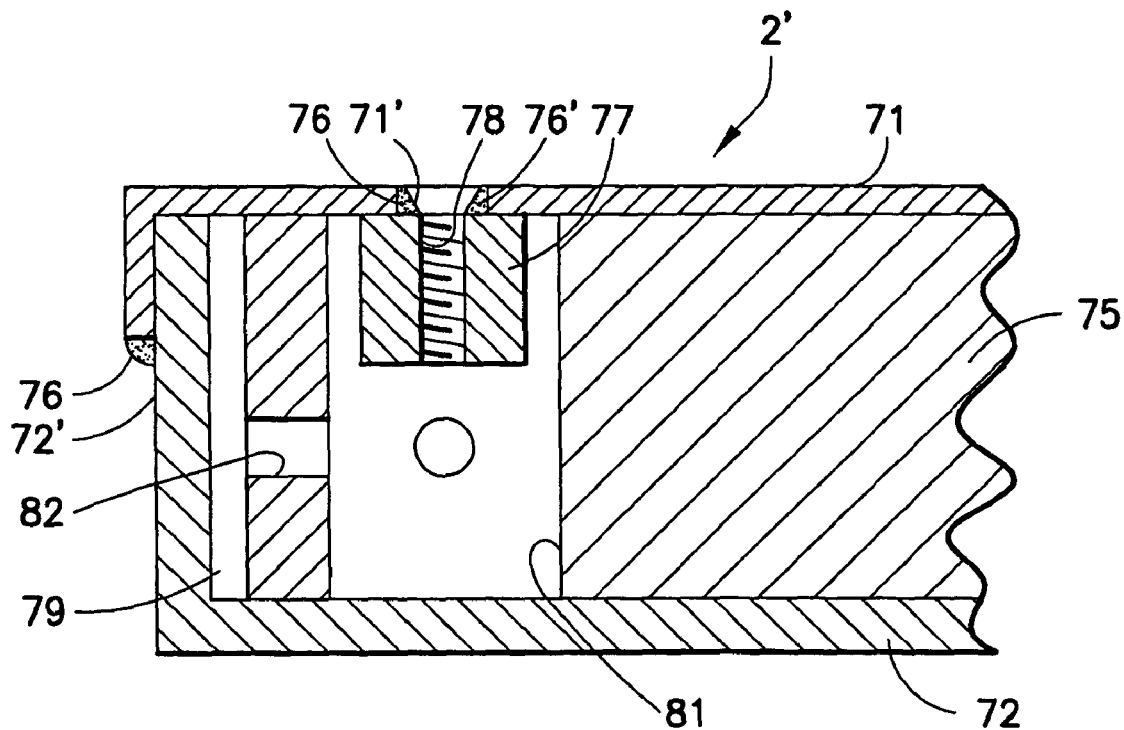
FIG. 12 is a cross-sectional side view of the griddle plate and fitting of FIG. 11.

A still further embodiment of the griddle plate of the present invention is depicted in FIGS. 9-13. The griddle plate of this embodiment, designated generally by the numeral 2', dispenses with the bars 10 and 12 as described in the previous embodiments. In the embodiment of the griddle plate 2', an upper cook surface 71 is made from a relatively thinner gauge stainless steel than the lower sheet 72, as perhaps best seen in FIG. 9. In this construction of griddle plate 2', the upper and lower sheets 71 and 72 are blanked in a configuration as shown in FIG. 10 and then fabricated by welding the blanks into box-like shapes which are later joined.

As shown in FIG. 10, the upper sheet 71 is generally of a rectangular shape assuming the overall dimension of the finished griddle plate 2'. The corners 73 are cut out when the sheet is blanked and then the fold line portions shown by dotted line 74 are folded at a 90° angle so that the sheet assumes a shallow box-like structure, as shown in FIG. 9. As stated, after the sheets are bent along the fold lines 74, the then-joined edges at previously cut-out corners 73 are welded to form an airtight junction or seal therealong. The bottom sheet 72 is formed in similar fashion and then the interior surfaces are thoroughly cleaned. An aluminum or copper core plate 75 of high thermal conductivity is placed in the interior of the lower box-like shape formed by the lower sheet 72, as shown in FIG. 9. The top sheet 71 is then fitted on the top of the upstanding side walls of lower sheet 72 and welded in place therealong, as shown by weld beads 76 in FIG. 9, along the entire perimeter thereof to establish an airtight seal. The fold lines for lower sheet 72 are designated by numeral 74' in FIG. 9.

Figure 13:
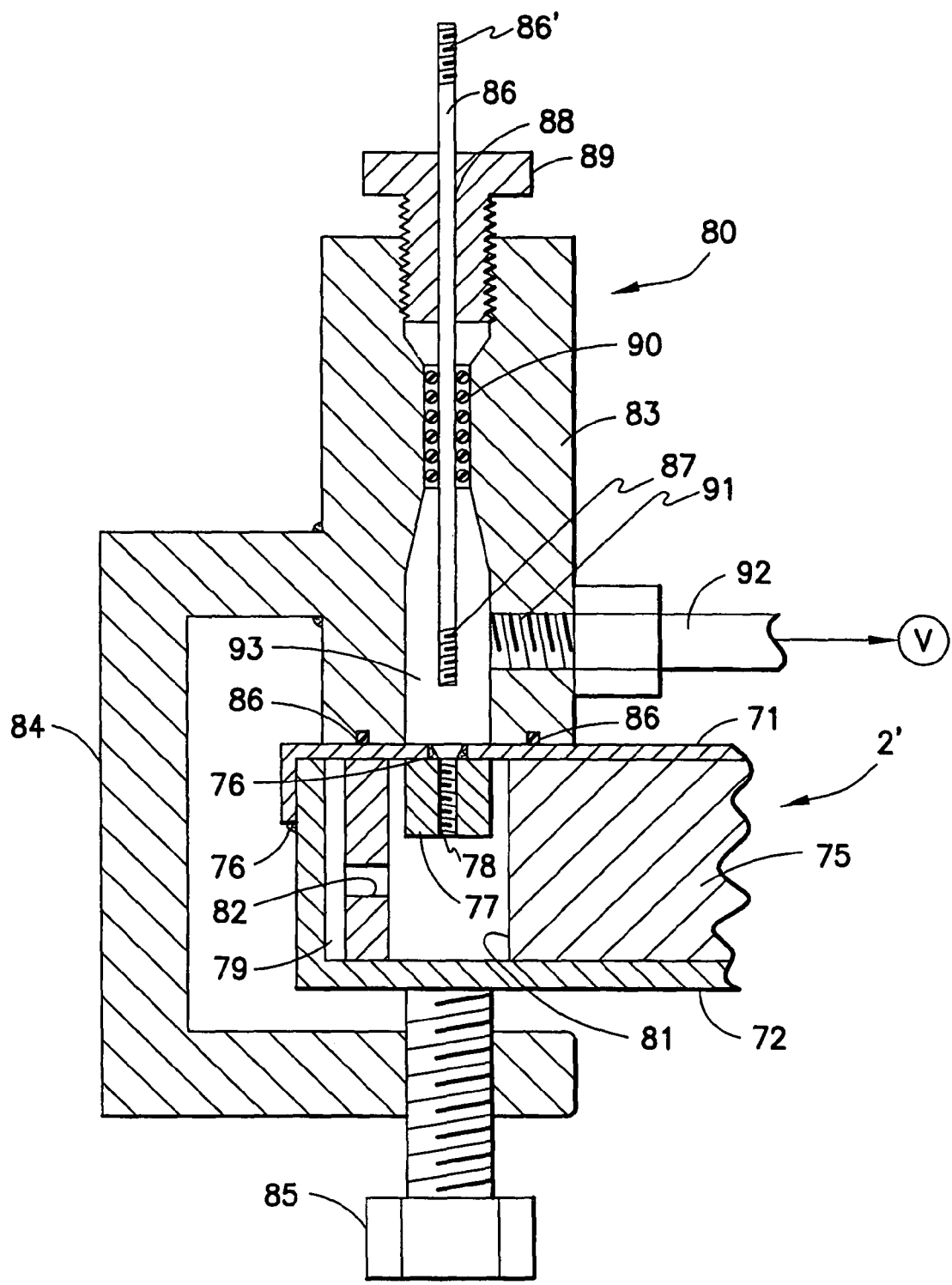
FIG. 13 is a cross-sectional view of a fixture for drawing a vacuum along with a fragmented partial side view of the griddle plate of FIG. 9.

A vacuum is established within the interior of the fabricated griddle plate 2' of FIGS. 9-13 by way of a vacuum fixture 80 shown in detail in FIG. 13. In order to establish a vacuum, a round fitting 77 having a threaded central bore 78 formed therethrough is welded at weld bead 76 to the upper sheet 71 around a hole 71' formed through the surface of the upper sheet 71, see FIG. 12. The fitting 77 is positioned within a bore 81 formed within the core plate 75. The bore 81 communicates with a space 79 between the perimeter of the core plate 75 and the vertical edges 72' of the lower sheet 72 by way of lateral holes 82 which radially extend from the bore 81 outwardly to the space 79, FIG. 12. The round fitting 77 is attached to the inside surface of the upper sheet 71 via a weld bead 76' prior to the fabrication and welding between the upper and lower sheets at weld beads 76. Otherwise, access could not be gained to the interior of the griddle plate 2'.

In order to establish a vacuum within the griddle plate 2' so as to obtain intimate contact between the upper cook surface 71 and the core plate 75 and lower sheet 72, a vacuum fixture 80 depicted in detail in FIG. 13 is employed. The fixture 80 includes a body 83 which carries a C-frame clamp structure 84 having a threaded bolt 85 to permit a tight contact between the fixture 80 and the griddle plate 2' when the vacuum is established. In order to effect a seal between the fixture 80 and the griddle plate 2' surface 71, an O-ring seal 86 is positioned at the bottom face of the fixture 80 to engage the upper sheet 71.

Fixture 80 further includes a vertically movable seal rod 86 having a threaded distal end 87 which is sized to threadably engage the threaded bore 78 of the round fitting 77. The seal rod 86 vertically moves within a bore 88 formed within the alignment cap member 89 which, itself, is threadably fitted at the top of the vacuum fixture 80, as shown in FIG. 13. The bore 88 is accurately machined such that when the seal rod 86 is fitted therein, the end 87 of the rod will accurately engage the threaded bore 78 and threadably engage therewith. A plurality of O-ring seals 90 is positioned within the interior of the fixture 80 to provide a slidable vacuum-tight seal therein. The fixture 80 also has a threaded bore 91 formed therethrough communicating with the interior 93 of the fixture 80 to permit attachment of a vacuum hose fitting 92 therewithin so that a vacuum can be drawn within the interior 93 of the fixture 80. The interior 93 also communicates with the threaded bore 78 of the round fitting 77 which, in turn, communicates with the bore 81 of the core plate 75 as well as the lateral holes 82 and the space 79. Hence, when the vacuum is drawn by way of a suitable vacuum pump with fitting 92, a vacuum condition exists within the space 79 via the communicating holes 82, 81, 78, 93 and 91. When a suitable vacuum has been established within the interior of the griddle plate 2', the upper sheet 71 and lower sheet 72 will closely engage the core plate 75. After this degree of vacuum has been established, the seal rod 86 is vertically slid downwardly through the alignment cap 89 such that the distal end 87 threadably engages the threaded bore 78 of the round fitting 77. The upper end 86' of the rod 86 may then be gripped by a suitable pliers or like tool, and rotated to permit the threads 87 to further engage with the threaded bore 78. Once sufficient threaded engagement has been established between the rod 86 and the fitting 77, the vacuum pump may be de-energized, and the C-clamp structure 84 may be unfastened by loosening the screw 85. The seal 90 at O-ring 86 is then broken and the clamping structure of fixture 80 is removed from the griddle plate 2' by lifting vertically upwardly leaving the seal rod 86 in place within the threaded bore 78. At this point, the upwardly protruding portion of rod 86 is cut along the surface of the upper sheet 71 and a TIG weld, for example, may be applied around the area of the rod 86 to ensure permanent sealing. The upper sheet 71 may then be appropriately finished and smoothed to provide a cosmetically pleasing appearance. The cook surface of upper sheet 71 may be further buffed to a mirror finish, if desired. After finishing, there is little or no evidence that a hole had been previously formed within the surface 71 where the fixture 80 had previously been employed. The griddle plate 2' is then ready to be placed into service.

The above-described griddle plate 2' offers excellent service and provides an advantage in that the upper surface 71 forming the cook surface may be much thinner than the lower surface 72. This provides quicker thermal response in the cook surface and also allows for welding of fittings to the heavier gauge lower sheet 72 for brackets, holders, grease traps, et cetera, which may be desirable in commercial griddle constructions.

By way of example, the upper sheet 71 may be constructed of a 300 series stainless steel while the bottom sheet 72 may be constructed of a like material or a 400 series ferritic stainless steel or other ferromagnetic material to provide the possibility of induction heating. The upper sheet 71 may be of a thinner gauge, as alluded to above, of, for example, 0.015 inch thick, while the lower sheet 72 may be of a heavier gauge, for example, 0.030 inch thick. This box-like construction of griddle plate 2' is also attractive for commercial food installations because the inner core 75 of aluminum or copper is fully enclosed. The round fitting 77 is also preferably made of stainless steel. The lower surface 72 is preferably of a finish which is dull or blackened to absorb heat more readily, particularly for radiant transfer purposes. The space 79 is as close as possible between the stainless steel of lower sheet 72 and the core 75 when the griddle plate 2' is in a hot state. Once again, the welding at bead 76 is preferably of a tungsten inert gas (TIG) or MIG or laser weld. The overlap between the upper sheet 71 and lower sheet 72 at the corners where weld bead 76 is applied is preferably about one-eighth inch of overlap. The core plate 75 is preferably about one-half inch in thickness, and a typical griddle plate 2' may be on the order in plan view of about 2 feet by 3 feet, for example.

In constructing the upper and lower sheets 71 and 72, the blanks shown in FIG. 10 are folded with the bottom sheet 72 welded at its inside corners while the top sheet 71 is welded at the outside of the corners. In this manner, a snug fit is obtained between the upper and lower corners, as shown in FIG. 9.

Still further, a film such as a graphite layer (not shown) may be applied between the core plate 75 and the cook surface formed by upper sheet 71 to accommodate any foreign particles that may remain between the core plate and the cook surface which would otherwise cause air gaps or bumps in the finished griddle plate. While it is difficult to weldably join a 400 series stainless steel to a 300 series steel, this could be accomplished by a continuous spot welding operation.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A composite griddle plate for cooking comprising a high heat conductivity core plate selected from aluminum or copper, an upper sheet of a metal selected from stainless steel or titanium defining a cook surface wherein said upper sheet faces said core plate, means applied around a perimeter of said griddle to provide an airtight seal for detachably securing the upper sheet to the griddle plate and including conduit means communicating with an interior of said griddle plate adapted to cooperate with a vacuum pump to evacuate said interior whereby said upper sheet intimately engages the core and wherein said upper sheet is thinner than the core plate to prevent thermal warpage of the upper sheet during use.

2. The griddle plate of claim 1 wherein the upper sheet is stainless steel and has a fluorocarbon non-stick surface applied thereto.

3. The griddle plate of claim 2 wherein the upper sheet is replaceable when the non-stick surface becomes worn.

4. A composite griddle plate for cooking food and adapted to be heated by an external source acting on a lower surface thereof, comprising at least a first sheet of metal defining a cook surface and a core plate of a metal having a relatively high coefficient of heat conductivity wherein the said first sheet remains in intimate contact with an upper surface of the core plate with the aid of a vacuum, and wherein the griddle plate is sealed around a perimeter thereof to maintain the vacuum, and wherein the first sheet of metal is thinner than the core plate to prevent thermal warpage during use, and wherein the core plate is made from a metal selected from the group consisting of aluminum and copper, and wherein the first sheet is one of stainless steel or titanium, and wherein the griddle plate is under a continuous vacuum selectively applied by a vacuum pump during use.

5. The griddle plate of claim 4, including a second sheet of metal defining a lower surface which is also in intimate contact with a lower surface of the core plate with the aid of said vacuum, wherein the second sheet of metal is one selected from the group consisting of 300 series stainless steel, 400 series ferritic stainless steel, or a non-stainless steel ferromagnetic material.

6. The griddle plate of claim 4 wherein the seal is provided by gasket means.

7. The griddle plate of claim 4 wherein the first metal sheet defining the cook surface has a non-stick surface applied thereto and wherein said first metal sheet is detachable from said composite by deactivation of the vacuum to permit replacement of said first metal sheet when the non-stick surface has become worn.

\* \* \* \* \*